No. 747,767. PATENTED DEC. 22, 1903.
L. RENAULT.
LUBRICATING DEVICE FOR HIGH SPEED AND EXPLOSION MOTORS.
APPLICATION FILED JAN. 23, 1903.
NO MODEL. 2 SHEETS—SHEET 1.

No. 747,767. PATENTED DEC. 22, 1903.
L. RENAULT.
LUBRICATING DEVICE FOR HIGH SPEED AND EXPLOSION MOTORS.
APPLICATION FILED JAN. 23, 1903.
NO MODEL. 2 SHEETS—SHEET 2.

WITNESSES:
W. M. Avery

INVENTOR
Louis Renault
BY
ATTORNEYS.

THE NORRIS PETERS CO., PHOTO-LITHO., WASHINGTON, D. C.

No. 747,767.                                                                                          Patented December 22, 1903.

UNITED STATES PATENT OFFICE.

LOUIS RENAULT, OF BILLANCOURT, FRANCE.

LUBRICATING DEVICE FOR HIGH-SPEED AND EXPLOSION MOTORS.

SPECIFICATION forming part of Letters Patent No. 747,767, dated December 22, 1903.

Application filed January 23, 1903. Serial No. 140,270. (No model.)

*To all whom it may concern:*

Be it known that I, LOUIS RENAULT, a citizen of the French Republic, residing at Billancourt, Seine, France, have invented certain new and useful Improvements Relating to Lubricating Devices for High-Speed and Explosion Motors, of which the following is a specification.

This invention has reference to lubricating devices for high-speed motors, and is now particularly applicable to explosion-motors. In motors of this kind it is not possible to effectually apply the lubricant to the heads of connecting-rods and bearings simply by means of the ordinary oil-bath, because if this oiling is effected for a sufficient time and a sufficient quantity of oil is used projections of oil are produced in the interior of the cylinders, which results in clogging of the ignition plugs and valves. Furthermore, the greater the speed of the motor the more difficult becomes the lubrication of the heads, because the action of centrifugal force throws the oil from the heads of the rods and prevents effective lubrification.

The object of this invention is to obviate these inconveniences, and to this end I utilize the action of the centrifugal force of the heads of the connecting-rods by collecting in reservoirs placed in a suitable manner above the bearings the oil thrown out from the heads of the connecting-rods, the said reservoirs serving at the same time as lubricators partly to the bearings, and consequently to these same heads of the connecting-rods.

Figure 1:
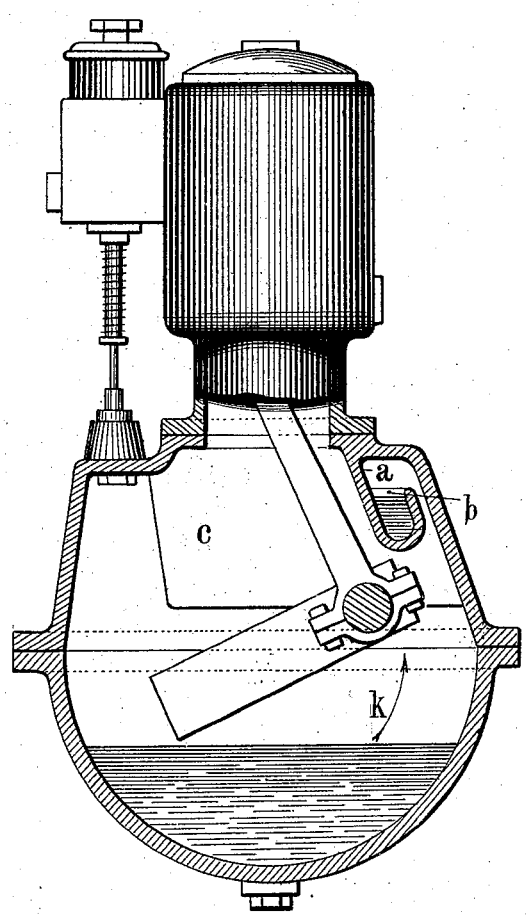
Figure 2:
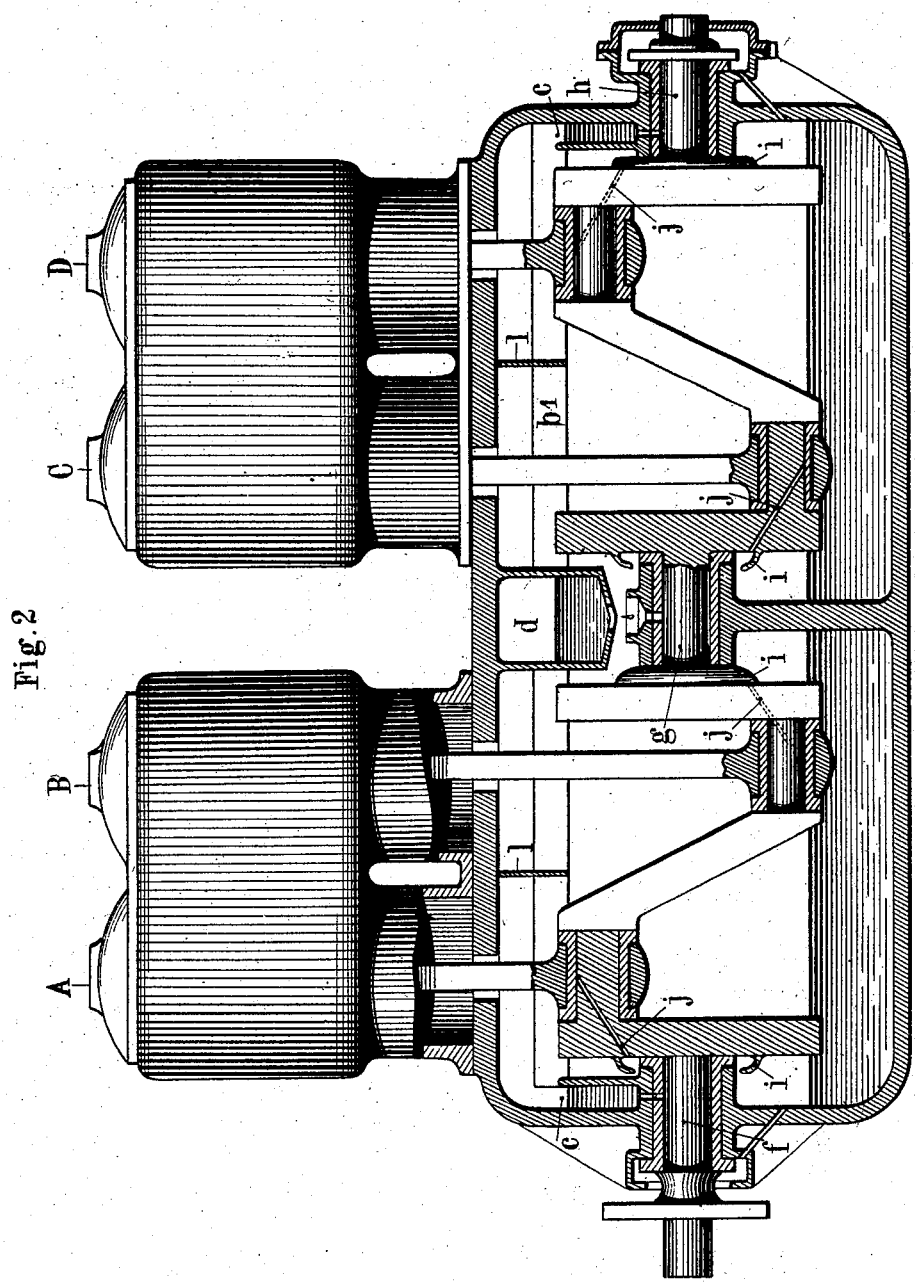

In the accompanying drawings, Figure 1 is a sectional elevation of the gear-case of a motor with four cylinders, taken through the axis of one of said cylinders. Fig. 2 is a longitudinal section of the same, showing the four cylinders.

The gear-case is provided at its upper part with a rib or flange $a$, forming a reservoir $b$, and having the form of a gutter, of which the opening is turned from the side of the wall of the gear-case which receives the projections of oil. This gutter communicates with a reservoir $c$, placed somewhat lower, but above the bearing. In a motor with four cylinders A B C D there exists three reservoirs $c\,d\,e$, one for each shaft-bearing; but the reservoir $d$ of double dimensions is common to two adjacent cylinders B C and is fed by the two adjacent connecting-rods. About the crank-axle and about the crank-pin of each bearing is arranged a circular groove or channel $i$, adapted to collect the excess of oil flowing out of the bearing. This groove $i$ communicates by the conduit $j$ with the head of the connecting-rod. Each bearing $f\,g\,h$ carries a reservoir $c\,d\,e$ and a groove $i\,i\,i$, as well as a conduit $j\,j\,j$, going to the head of the connecting-rod.

Operation of my improved device is as follows: Assuming the direction of the normal motion of the motor to be that of the arrow $k$, Fig. 1, the heads of each of the driving connecting-rods dip into the oil which is accumulated at the bottom of the gear-case. When the heads leave the oil, the centrifugal force projects the oil which the heads have gathered against the walls of the gear-case, and the oil thus projected is gathered in the gutter $b$. When the quantity of oil is sufficiently large, it flows down into each of the reservoirs $c\,d\,e$ corresponding to each of the bearings for the crank-shaft of the connecting-rods. The oil filling the reservoirs $c\,d\,e$ lubricates each of the bearings $f\,g\,h$ and the excess of oil flowing therefrom passes into the grooves $i\,i\,i$, where it is again subjected to the action of the centrifugal force due to the movement of the connecting-rods and flows from these channels through the conduits $j$ to the heads of each of the connecting-rods, which it thereupon lubricates. In the example represented in the drawings—i.e., a motor of four cylinders—partitions $l\,l$ are arranged in the gear-case so as to isolate each connecting-rod, thus making the lubrification of each rod independent of the other and thereby avoiding the accumulation of oil in a single reservoir.

My improved system of lubrification is applicable to all kinds of motors, but is more particularly adapted to those of motor-vehicles.

Having now particularly described and ascertained the nature of my said invention and in what manner the same is to be performed, I declare that what I claim is—

1. In a lubricator of the class described, the combination with a casing, and a plurality of shaft-bearings therein, of a plurality of reservoirs disposed above and communicating with said shaft-bearings, and a collecting-gutter ranging lengthwise of the casing and communicating with said reservoirs for supplying them with lubricant collected by said gutter.

2. In a lubricator of the class described, the combination with a casing, and a plurality of shaft-bearings, of a plurality of cranks each provided with a transverse passage and with a collecting-gutter which occupies such relation to one of the shaft-bearings as to collect the lubricant escaping therefrom, a plurality of reservoirs in communication with the shaft-bearings, and a collecting-gutter ranging lengthwise of the casing and communicating with the reservoirs.

3. In a lubricator of the class described, the combination with a casing, a series of shaft-bearings therein, and a crank-shaft mounted in said bearings and provided with a series of cranks, of a gutter supported within said casing adjacent to the path of the cranks and adapted to collect the lubricant thrown centrifugally against the casing by the rotation of said cranks, a series of reservoirs communicating with said gutter and with the bearings of the crank-shaft, and means for conveying lubricant to the crank-pins of the shaft.

4. In a lubricator of the class described, the combination with a casing, a series of shaft-bearings therein, and a shaft having a plurality of cranks, of a gutter within said casing, a series of reservoirs communicating with the gutter and with the shaft-bearings, and gutters carried by the cranks of the shaft and operatively disposed to the bearings of said shaft, said gutters on the cranks being connected by inclined conduits with the crank-pins of said shaft.

In witness whereof I have hereunto set my hand in presence of two witnesses.

LOUIS RENAULT.

Witnesses:
FELIX BARON,
AUGUSTUS E. INGRAM.